T. H. HUMPHREYS.
SPECULUM.
APPLICATION FILED APR. 8, 1910.
997,823.
Patented July 11, 1911.
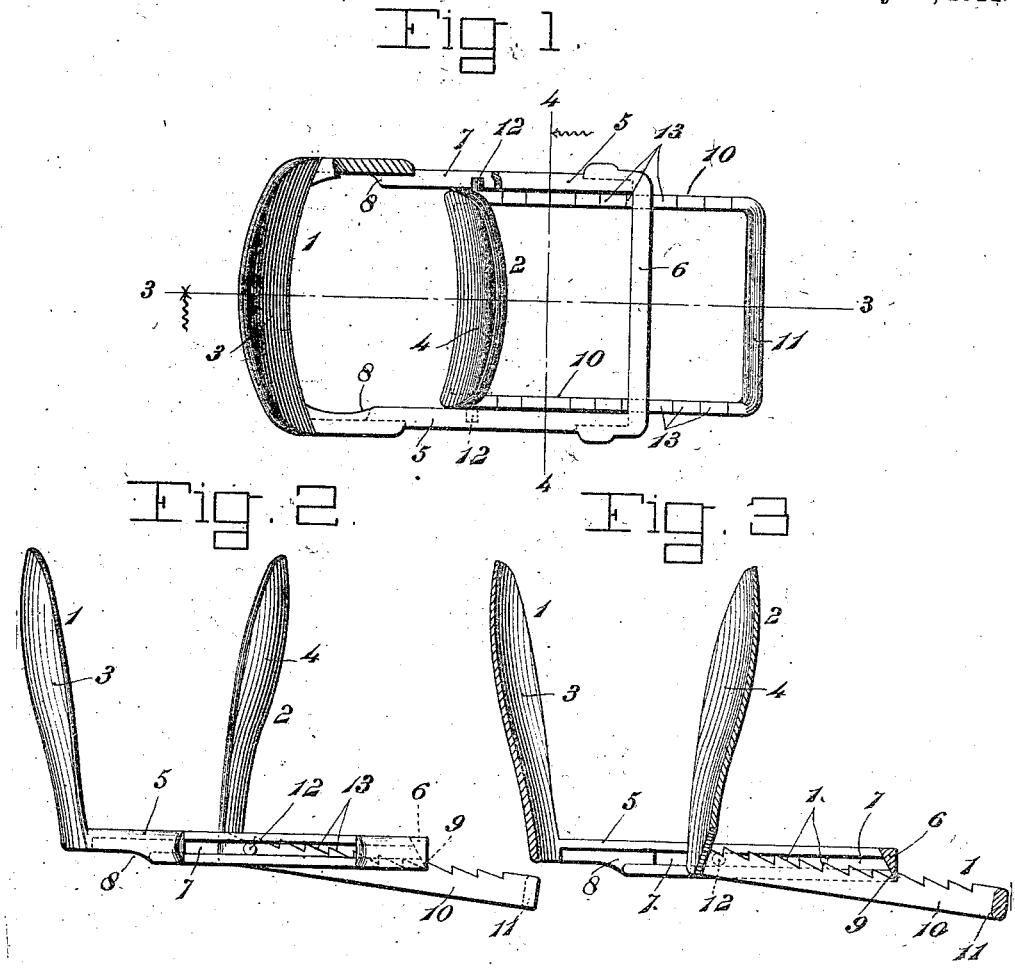
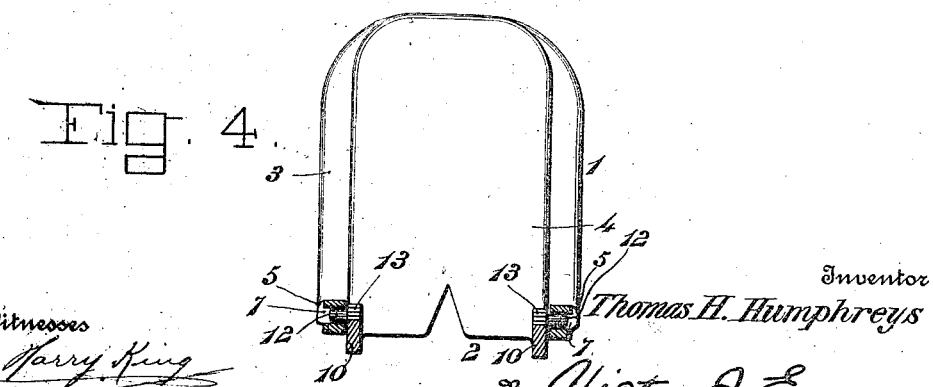
Witnesses
Harry King
C. C. Hines.
Inventor
Thomas H. Humphreys
By Victor J. Evans
Attorney

UNITED STATES PATENT OFFICE.

THOMAS H. HUMPHREYS, OF KISSEE MILLS, MISSOURI.

SPECULUM.

997,823.   Specification of Letters Patent.   Patented July 11, 1911.

Application filed April 8, 1910. Serial No. 554,274.

*To all whom it may concern:*

Be it known that I, THOMAS H. HUMPHREYS, a citizen of the United States, residing at Kissee Mills, in the county of Taney and State of Missouri, have invented new and useful Improvements in Specula, of which the following is a specification.

This invention relates to specula of the bivalve type, the object of the invention being to provide a simple and effective device of this character which, while readily capable of adjustment to expand the orifice to the desired degree, is free from nuts, bolts, screws and other complexities of parts and surfaces in which disease germs may lodge, and which is adapted to be conveniently taken apart for thorough sterilization.

The invention consists of the features of construction, combination and arrangement of parts herein fully described and claimed, reference being had to the accompanying drawing, in which:—

Figure 1 is a front elevation of a speculum embodying my invention. Fig. 2 is a side elevation of the same. Fig. 3 is a sectional view taken on the line 3—3 of Fig. 1. Fig. 4 is a sectional view on the line 4—4 of Fig. 1.

The device comprises a pair of members 1 and 2 provided, respectively, with coöperating blades 3 and 4, which may be of any of the forms in common use, or any other suitable form.

The member 1 is provided with a handle or shank comprising parallel side bars 5 secured at one end to the inner end of the blade 3 and connected at their opposite ends by a cross bar 6. In said arms are formed longitudinal guide grooves or slots 7, opening for a portion of their length through both the inner and outer sides of the bars. The rear walls or the grooves or slots are cut away at their lower ends to provide entrance spaces 8, and the bar 6 has its rear face beveled downwardly and inwardly to form a locking rib or edge 9. The member 2 is also provided with a handle or shank composed of parallel side bars 10 secured at their inner ends to the blade 4 and connected at their outer ends by a cross bar 11. The blade 4 is of reduced width with respect to the blade 3 and is adapted to enter and move in the space between the side bars 5 of the member 1, the side bars 10 thereof being provided with laterally extending guide pins or projections 12 to travel in the grooves or slots 7 and thus admit of the adjustment of the member 2 upon the member 1 to space the blade 4 a greater or less distance from the blade 3, as occasion may require in the use of the instrument.

For the purpose of locking the member 2 in adjusted position upon the member 1, the bars 10 are provided upon their front faces with downwardly and inwardly inclined rack teeth or notches 13 adapted to engage and interlock with the rib or edge 9 of the bar 6. It will be observed that the bars 10 extend through the spaces between the bars 5 at an upward and rearward inclination, so that the pressure applied upon the blade 4 in the use of the instrument will serve to hold the parts in locking engagement and prevent possible slipping of the member 2 upon the member 1. After the device has been used, the arms 10 may be tilted outward from engagement with the locking edge 9 and the member 2 slid downward on the arms 5 until the pins or projections 12 pass into the entrance openings 8, whereupon said member may be detached from the member 1.

It will be observed that by the construction described, a simple form of instrument is provided, which is free from the use of a number of parts in which disease germs are liable to lodge, and in which the members may be readily disassembled after use and thoroughly sterilized.

Having thus described the invention, I claim:

A speculum comprising a member embodying a blade, a shank composed of spaced parallel side bars having longitudinal guide slots and open guideways at their inner ends leading to said slots, and a cross bar connecting the outer ends of said side bars and beveled to provide a transverse locking rib, and a second member embodying a blade, a shank composed of spaced parallel side bars adapted to fit between the side bars of the first-named member, pins projecting laterally from said side bars to said second member and slidably and pivotally engaging the guide slots in the side bars of the first-named member, and rack teeth upon the side bars of the second-named member to engage and interlock with the locking rib of the first-named member.

In testimony whereof I affix my signature in presence of two witnesses.

THOMAS H. HUMPHREYS.

Witnesses:
OTTO R. WOLF,
S. C. KISSEE.